Jan. 9, 1945.　　　　J. N. READ　　　　2,366,751
AIRFOIL
Filed Oct. 1, 1942
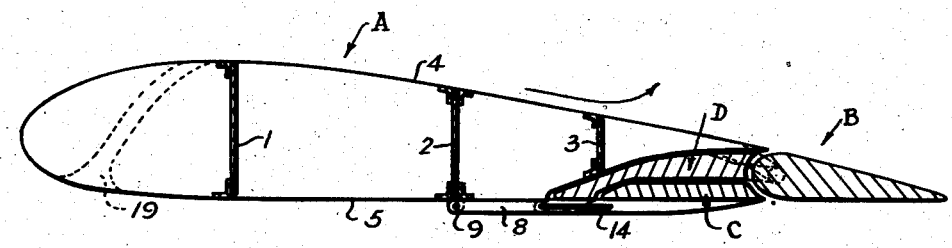
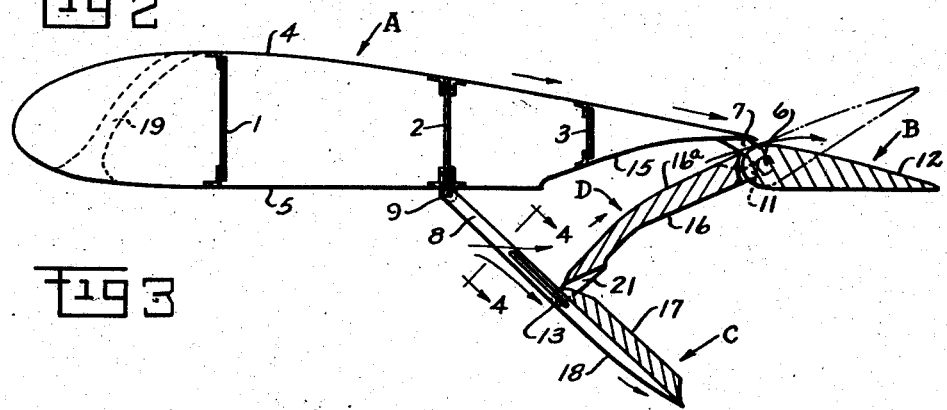
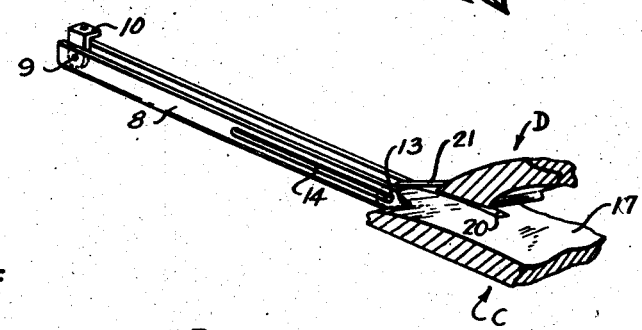
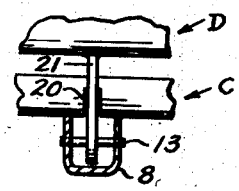
INVENTOR
JOHN N. READ

Patented Jan. 9, 1945

2,366,751

UNITED STATES PATENT OFFICE 2,366,751

AIRFOIL

John N. Read, Santa Monica, Calif.

Application October 1, 1942, Serial No. 460,345

9 Claims. (Cl. 244—42)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to airfoils such as may constitute the supporting and control surfaces of aircraft or the like. More particularly, the invention relates to the provision of auxiliary control surfaces in conjunction with aircraft wings for the purpose of controlling the movements of the airfoil through the air and for the reduction of its forward velocity when landing; also to the problem of increasing lift of the airfoil at high angles of attack while maintaining adequate control thereof.

A general object of the invention, therefore, is to provide auxiliary control means for an airfoil, operable to increase the lift of the airfoil at high angles of attack while maintaining adequate lateral control.

Another general object of the invention is to provide auxiliary control means for an airfoil, operable to increase the resistance of the airfoil in its passage through the air, whereby to reduce its forward velocity while maintaining adequate lateral control.

A particular object of the invention is to provide means in conjunction with an airfoil operable to collect and accelerate a large volume of air in order to produce a high-velocity air stream for the purposes mentioned.

Another object of the invention is to introduce a high-velocity air stream to the airfoil in such a manner as to smooth the air flow over the airfoil and render the control sections thereof more effective for their purposes.

Another object of the invention is to introduce a high-velocity air stream at the trailing edge of a wing section, directed toward the trailing edge of the movable control section employed therewith.

Another object of the invention is to introduce a high-velocity air stream to an airfoil including a fixed wing section and a movable control section in such a manner as to cause the air stream to pass over the upper surface of the control section and to tend to draw the air impinging the upper surface of the wing section in a smooth flow thereover.

A particular object of the invention is to provide auxiliary control means for an airfoil so constructed and arranged as to divert air from the air stream impinging the wing section, accelerate said air, and cause the same to pass intermediate the wing section and the control section for the purposes mentioned and, preferably, in the manner indicated.

When bringing an airplane into land it is desirable to reduce the landing speed as much as possible commensurate with maintenance of adequate control of the aircraft during such time so as to shorten the distance over which the aircraft must travel after making contact with the ground. For the purpose of reducing landing speed of an aircraft when the same is about to land, auxiliary control surfaces known as flaps have been provided heretofore. The use of such flaps when attached to the aircraft wing forwardly of the regular control surfaces or ailerons, however, reduces the effectiveness of the ailerons to maintain lateral control of the aircraft. Particularly is this true in connection with the use of full span wing flaps, making use of full span wing flaps largely impractical because of their effect of interrupting the air stream flow over the ailerons and destroying the ability of the latter to control the aircraft.

The invention provides a construction of airfoil in which full span auxiliary control surfaces or flaps may be employed with the advantages derived therefrom in reference to increasing the wing-lift and substantially decreasing the forward velocity of the aircraft while enabling the maintenance of lateral control during the operation of the flaps for this purpose.

In carrying the invention into practice, I provide an airfoil comprising a main fixed wing section and a movable control section or aileron hinged adjacent the trailing edge of the wing section and normally spaced from the trailing edge of the wing section to provide a constricted passage for air intermediate said sections. An auxiliary control section constituting a modified form of wing flap is hinged to the wing section for swinging movement toward and away from the latter. A scoop section is hinged to the wing section adjacent the trailing edge thereof and extends forwardly therefrom. This scoop section has a pivotal connection, adjacent its forward edge, with the auxiliary control section or flap, and this pivotal connection is preferably shiftable relative to the flap so that the scoop and flap means may be swung into position with their leading edges adjacent one another and spaced from the wing section, and so that the scoop and flap may also be swung into close proximity to the wing section to streamline the airfoil for normal operation, the wing being undercut at the trailing edge so as to provide a bay or depression for receiving the collapsed scoop and flap sections within the wing contour under such condition.

The flap and scoop sections of the airfoil of my invention are designed to extend substantially the full length of the span of the airfoil, and the arrangement of these sections is such that when the same are lowered into the air stream, the flap section is spaced from the main wing section and the flap and scoop sections have their leading edges extending in adjacent relation, with these sections themselves forming an angle, the apex of which is defined by their leading edges and faces into the air stream to divide the same, applying part of the force thereof in a downward direction against the scoop section and another part of the force in an upward direction against the flap section and diverting part of the air from said air stream so as to cause it to pass along the surface of the scoop section intermediate the latter and the main wing section and be directed toward the restricted passage provided between the aileron and the main wing section.

The result of this action of the scoop and flap sections upon the air stream when they are in their operating position is not only to increase the camber of the wing but to provide a high-velocity air flow introduced at the trailing edge of the wing section and directed over the aileron toward the trailing edge thereof to make the same more effective for its controlling functions, and at the same time the introduction of this high-velocity air stream at the place mentioned tends to draw the air in a smooth flow over the wing section, thereby increasing the lift effect thereon.

The arrangement of the scoop and flap sections is such that the operating forces necessary to raise and lower the same into and out of the wing contour are materially reduced, this being one of the objects and accomplishments of the invention.

Other objects, advantages, and features of novelty will appear more fully as the description of the invention proceeds in conjunction with the accompanying drawing, in which Figure 1 is a vertical transverse section through an airfoil embodying the invention, showing the scoop and flap sections within the wing contour in the position occupied under normal level flight conditions;

Figure 2 is a view similar to Figure 1, but showing the scoop and flap sections moved into operating position for accomplishing their objectives;

Figure 3 is a perspective view showing details of the connection of the scoop and flap sections, certain parts being broken away and shown in section;

Figure 4 is a detailed view taken on the line 4—4 of Figure 2, looking in the direction of the arrows.

Now referring to the drawing for a detailed description of the invention, the embodiment of my improved airfoil there shown comprises a main wing section generally designated by the letter A, a control section or aileron generally designated by the letter B and positioned at the trailing edge of the wing section A, a flap section C, and scoop section D. The wing section A comprises the usual beams or spars 1, 2, and 3, over which extends a covering providing the upper and lower wing surfaces 4 and 5 respectively.

The aileron B is hinged to swing about a horizontal axis and for this purpose is pivoted as at 6 to a bracket 7 offstanding from the trailing edge of the wing section A. The flap section C is provided with one or more arms 8 rigidly fixed thereto and provided for the purpose of hingedly connecting the flap to the wing section A in such a manner that the flap will be spaced at some distance from the wing section A when the flap and scoop sections are moved out of the wing contour to interrupt the air flow over the wing section. The arms 8 are of U or channel form and are pivotally connected, as at 9, to a bracket 10 secured to the wing spar 2.

The scoop section D may be hinged to the wing section A adjacent the trailing edge of the latter and for this purpose may, as shown, be provided with a hinge bracket 11 fixed thereto and pivoted to bracket 7 to swing about axis 6 upon which the aileron is hinged. The hinging of the scoop section D to swing about the axis 6 is such that when the scoop section D is moved out of wing contour, said scoop section D is spaced at its trailing edge from the trailing edge of the wing. Likewise the aileron B, by its pivotal mounting to bracket 7, is arranged so that its leading edge is spaced from the trailing edge of the wing section A to provide a constricted passage for air intermediate the leading edge of the aileron B and the trailing edge of the wing section A.

The arrangement of the aileron B in reference to its pivotal axis 6 is such that when the aileron is moved upwardly from its full-line position of Figure 2 to its dotted line position in said figure, it tends to close the passage intermediate the leading edge of the aileron B and the trailing edge of the wing section A, and, in fact the upper surface 12 of the aileron B may in its fully raised position engage the trailing edge of the wing section A to substantially close this passage, destroying the effect of the air stream diverted intermediate the scoop D and the wing section A.

The arrangement of the scoop section D, in its pivotal connection to the bracket 7, is such that its surface 16a nearest the wing section A is substantially contiguous with the upper surface 12 of the aileron B, and when the flap and scoop sections are moved out of the contour of the wing A the scoop section D provides a passage for air intermediate the same and the wing section A leading to the constricted passage intermediate the aileron B and wing section A so as to divert air from the air stream impinging the lower surface 5 of the wing section A and direct said air in a smooth flow over the surface 16a of the scoop section D and the surface 12 of the aileron section B.

As illustrated, the scoop section D extends forwardly from its pivotal connection with bracket 7, and at its forward or leading edge the scoop section D is provided with pivot means comprising a pin 13 for pivotal connection of the scoop D with the wing flap C. For this purpose the arm 8 has a longitudinal slot 14, with which the pivot means or pin 13 may engage, or within which the pin 13 may extend so that the pivotal connection of the forward or leading edge of the scoop section D with the wing flap C is shiftable relative to the latter. The flap section C may be provided with a slot 20 for receiving the ear extension 21 of the scoop section D when the scoop and flap sections are in open position of Figure 2. The ear extension 21 may carry the pivot pin 13.

The wing section A may be undercut or concaved at its trailing edge to provide a bay or recess, as indicated at 15, comformable with the upper surface 16a of the scoop section D, and the adjacent surfaces 16 and 17 of the scoop section D and flap section C respectively may be made to conform so that they will fit together and enable the scoop and flap sections to fit closely together and be received within the wing contour when in the position shown in Figure 1 to maintain the streamlined contour of the wing under normal flight conditions when the scoop and flap sections are not being operated for their purposes.

In operation, the respective sections of the airfoil will occupy the positions as shown in Figure 1 under normal conditions of level flight, in which circumstances the scoop and flap sections D and C will be folded into the main wing section A, as shown in Figure 1, and will not have any effect on the operation of the wing section A or the aileron B. Operating force may be applied to the flap section C and scoop section D in any suitable manner for the purpose of moving the same into the air stream and preferably such operating force will be applied adjacent the pivotal axis 13. When the airfoil is in flight, because of the arrangement of the scoop and flap sections, as soon as the same are moved away from the wing section A to such an extent that the air stream may impinge the upper surface 16a of the scoop section D, the sections C and D will tend to be moved to open position, as shown in Figure 2, by the force of the air stream which will be divided, by reason of the angular arrangement of these sections, so that part of the air stream will be directed against the upper surface 16a of the scoop section D, and part of the air stream will be directed against the lower surface 18 of the flap section C. Thus a part of the force of the air stream will tend to move the flap and scoop sections toward fully opened position, as indicated in Figure 2, and part of the force of said air stream will tend to move the flap and scoop sections toward closed or collapsed position as indicated in Figure 1. In this manner the operation of the flap section either up or down is assisted by the action of the air stream. It will be noted that when these sections C and D are in fully open position, as indicated in Figure 2, their leading edges are in adjacent relation and they form an angle, the apex of which is defined by the respective leading edges of these sections.

When the flap and scoop sections C and D are opened away from the wing, as indicated in Figure 2, the flap section C serves to increase the camber of the wing and there is provided a passage for air between the surfaces 16a and 15 of the scoop section D and wing section A respectively, which leads to the constricted passage intermediate the leading edge of the aileron and the trailing edge of the wing section A. Thus air from the air stream, impinging the lower surface 5 of the wing A, is diverted between the scoop section D and the wing A and caused to have its velocity increased by movement through the constricted passage between the aileron B and wing section A so as to provide a high-velocity air stream passing in a smooth flow over the surfaces 16a and 12 of the scoop section D and the aileron B respectively. In this connection it may be noted that the concaved surface 15 of the wing section A may be extended in its curvature over the leading edge of the aileron B so as to assist in directing the air flow over the upper surface 12 of the aileron B when the latter is moved downward from its neutral full-line position of Figure 2.

The introduction of air diverted from the air stream at high velocity at the trailing edge of the wing section A, and directed from the trailing edge of the wing section A in a rearward direction thereover, creates a vacuum on the upper surface of the wing section A adjacent the trailing edge thereof which tends to draw the air stream in a smoother flow over the upper surface 4 of the wing section A from the leading edge to the trailing edge thereof, causing the air stream to more closely impinge the entire upper surface 4 of the wing section A during such movement of the air stream along said surface from the leading edge to the trailing edge of the wing section A. Were it not for the effect of the high-velocity air stream introduced at the trailing edge of the wing section A over the upper surface 12 of the aileron B, as above described, in drawing the air stream in a smoother flow over the upper surface 4 of the wing section A, the air stream impinging said upper surface 4 of the wing section A would tend to break away from said surface at some more advanced point intermediate the leading and trailing edges of said wing section, as is well known to happen in the normal operation of the airfoil through the air when the auxiliary control sections, in this instance comprising the flap C and scoop D, are in closed position within the contour of the wing section A. Consequently when the flap section C and scoop section D are moved to open position as indicated in Figure 2 there is created a smoother flow of the air stream over the upper surface 4 of the wing section A more closely impinging said upper surface throughout a greater area thereof as the air stream passes from the leading edge to the trailing edge of said wing section A. This supplies an additional lifting force to the wing section A and also since the air stream passing over the upper surface 4 of the wing section A tends to continue in its path of impingement of the upper surface 4 beyond the trailing edge of the latter, this smoother air flow tends to assist the high velocity air stream introduced at the trailing edge of the wing section A in passing over the upper surface 12 of the aileron B in more close impingement therewith to render said aileron more effective for its controlling function.

The added lifting force on the wing section A created by the smoother flow of air over the upper surface thereof, as above described, increases the effective controlling action of the aileron B. This is due to the fact that when wings of an airplane are provided with the flap C and scoop D, in accordance with the invention, and these sections are opened on both wings in the manner indicated in Figure 2 so that the increased lifting force is applied to both wings, the raising of one aileron from neutral position, indicated by the dotted-line position of said figure, not only acts in the usual manner to interrupt the air flow over the upper surface 4 of the wing section A and thereby depress the wing, but since raising of the aileron B acts to close the passage intermediate its leading edge and the trailing edge of the wing and thereby destroy the added lifting force applied to the wing by the high-velocity air stream diverted from below the wing, the effect of raising the aileron B from a normal level flight position tends to depress the wing to an even greater extent than would otherwise be the case, were the flap and scoop sections of the invention not employed. In other words when, in the operation of an aircraft with the parts positioned as in Figure 2, raising of the aileron B from normal full-line position not only acts to depress the wing to the normal extent, but depresses the wing to an additional extent corresponding to the degree of added lift which was supplied by the high-velocity air stream passing intermediate scoop D and wing A and which is now destroyed by the raising of the aileron B closing the passage between the same and the wing section A.

As illustrated, the wing section A may be provided with a conventional leading edge slot 19 extending therethrough and providing a passage for air from the lower surface 5 through the wing section A to the upper surface 4 thereof which will serve to insure the flow of air over the upper surface 4 of the wing section A at high angles of attack. The use of such a leading edge slot 19 in connection with the airfoil of my invention, illustrated herein, will render the same more effective for purposes described. It will be understood, of course, that one or more spaced arms 8 may be employed, and since they are not of substantial width, they will not interfere with the flow of air intermediate the scoop section D and the wing section A.

What I claim as new and desire to secure by Letters Patent is:

1. In an airfoil of the class described, in combination, a fixed wing section, a movable control section pivoted thereto adjacent the trailing edge thereof, an auxiliary control section pivoted to said wing section, and a scoop section pivoted to the wing section adjacent the trailing edge thereof and extending forwardly therefrom, said scoop section being pivotally and slidably connected adjacent its forward edge to said auxiliary section.

2. In an airfoil of the class described, in combination, a fixed wing section, a movable control section pivoted thereto adjacent the trailing edge thereof, an auxiliary control section pivoted to said wing section, and a scoop section pivoted to the wing section adjacent the trailing edge thereof and extending forwardly therefrom, said scoop section being pivotally connected adjacent its forward edge to said auxiliary section, the axis of the last mentioned pivotal connection being shiftable forwardly and rearwardly of said auxiliary section.

3. In an airfoil of the class described, in combination, a fixed wing section, a movable control section pivoted thereto adjacent the trailing edge thereof, said control section being normally spaced from the trailing edge of said wing section to provide a constricted passage for air intermediate said sections, an auxiliary control section pivoted to said wing section and swingable toward and away from said wing section, said auxiliary section being spaced from the wing section when swung away from the latter, and a scoop section pivoted to the wing section adjacent the trailing edge thereof and extending forwardly therefrom, said scoop section being pivotally and slidably connected adjacent its forward edge to said auxiliary section whereby to provide a passage for air intermediate said wing section and said scoop section leading to and communicating with the aforesaid constricted passage when the auxiliary section is swung away from the wing section.

4. An airfoil as claimed in claim 3 wherein the said control section is swingable to a position substantially closing said first passage.

5. In an airfoil of the class described, in combination, a fixed wing section, a movable control section pivoted thereto, an auxiliary control section, an arm associated therewith and extending therefrom, said arm being pivotally connected to said wing section, said arm having a longitudinal slot, a scoop section pivoted to the wing section adjacent the trailing edge thereof and extending forwardly therefrom, and pivot means on said scoop section engaging said slot and providing a pivotal connection between the scoop section and auxiliary section shiftable relative to the latter.

6. An airfoil as claimed in claim 1 wherein the wing section is provided with a recess for receiving the flap and scoop sections within the wing contour in inoperative position.

7. In an airfoil of the class described, in combination, a fixed wing section, a movable control section pivoted thereto adjacent the trailing edge thereof, said control section being normally spaced from said wing section proper to provide a constricted passage for air intermediate the said sections, an auxiliary control section pivoted to said wing section and swingable toward and away from said wing section, said auxiliary section being spaced from the wing section when swung away from the latter, and a scoop section having its trailing edge pivoted to the wing section adjacent the leading edge of the movable control section, said scoop section extending forwardly from its pivotal connection with the wing section, said scoop section being pivotally connected adjacent its leading edge to said auxiliary section, the axis of said last mentioned pivotal connection being shiftable relative to said auxiliary section, the pivotal connection of the scoop section with the wing section being arranged with its axis in spaced relation to the wing section proper whereby the entire scoop section may be swung to a position in spaced relation to the wing section, and whereby to provide a passage for air intermediate said wing section and said scoop section leading to and communicating with the aforesaid constricted passage when the auxiliary section is swung away from the wing section.

8. In an airfoil of the class described, in combination, a fixed wing section, a movable control section pivoted thereto adjacent the trailing edge thereof, said control section being normally spaced from said wing section proper to provide a constricted passage for air intermediate the said sections, an auxiliary control section pivoted to said wing section and swingable toward and away from said wing section, said auxiliary section being spaced from the wing section when swung away from the latter, and a scoop section having its trailing edge pivoted to the wing section adjacent the leading edge of the movable control section, said scoop section extending forwardly from its pivotal connection with the wing section, said scoop section being pivotally connected adjacent its leading edge to said auxiliary section, the axis of said last mentioned pivotal connection being shiftable relative to said auxiliary section to enable the scoop and auxiliary sections to be moved into and out of angular disposition with respect to one another, said scoop and auxiliary sections being movable into said angular disposition with their leading edges adjacent one another when the said latter two sections are swung away from the wing section, the pivotal connection of the scoop section with the wing section being arranged with its axis in spaced relation to the wing section proper whereby the entire scoop section maybe swung to a position in spaced relation to the wing section, and whereby to provide a passage for air intermediate said wing section and said scoop section leading to and communicating with the aforesaid constricted passage when the auxiliary section is swung away from the wing section.

9. In an airfoil of the class described, in combination, a fixed wing section, a movable control section pivoted thereto adjacent the trailing edge thereof, said control section being normally spaced from said wing section proper to provide a constricted passage for air intermediate the said sections, an auxiliary control section pivoted to said wing section and swingable toward and away from said wing section, said auxiliary section being spaced from the wing section when swung away from the latter, and a scoop section having its trailing edge pivoted to the wing section adjacent the leading edge of the movable control section, said scoop section extending forwardly from its pivital connection with the wing section, said scoop section being pivotally connected adjacent its leading edge to said auxiliary section, the axis of said last mentioned pivotal connection being shiftable relative to said auxiliary section to enable the scoop and auxiliary sections to be moved into and out of angular disposition with respect to one another, said scoop and auxiliary sections being movable into said angular disposition when said latter two sections are swung away from the wing section, the pivotal connection of the scoop section with the wing section being arranged with its axis in spaced relation to the wing section proper whereby the entire scoop section may be swung to a position in spaced relation to the wing section, and whereby to provide a passage for air intermediate said wing section and said scoop section leading to and communicating with the aforesaid constricted passage when the auxiliary section is swung away from the wing section.

JOHN N. READ.